United States Patent
Guagenti et al.

(10) Patent No.: US 9,654,933 B2
(45) Date of Patent: May 16, 2017

(54) SYSTEMS AND METHODS FOR SYNCHRONIZING OPTICAL TRANSMITTERS

(71) Applicants: Mark Guagenti, Huntsville, AL (US); David Ewing, Madison, AL (US)

(72) Inventors: Mark Guagenti, Huntsville, AL (US); David Ewing, Madison, AL (US)

(73) Assignee: Synapse Wireless, Inc., Huntsville, AL (US)

( * ) Notice: Subject to any disclaimer, the term of this patent is extended or adjusted under 35 U.S.C. 154(b) by 492 days.

(21) Appl. No.: 14/176,936

(22) Filed: Feb. 10, 2014

(65) Prior Publication Data
US 2015/0229422 A1 Aug. 13, 2015

(51) Int. Cl.
*H04B 10/00* (2013.01)
*H04W 4/04* (2009.01)
*H04J 14/08* (2006.01)
*H04J 3/06* (2006.01)

(52) U.S. Cl.
CPC ........... *H04W 4/043* (2013.01); *H04J 3/0638* (2013.01); *H04J 14/08* (2013.01)

(58) Field of Classification Search
CPC ..... H04B 10/1149; H04J 14/08; H04J 3/0638; H04J 3/0602; H04W 4/021; H04W 4/043; H04W 72/005; G06K 2017/0045
USPC .............. 398/82, 35, 98, 115, 118, 128, 130
See application file for complete search history.

(56) References Cited

U.S. PATENT DOCUMENTS

| 6,175,308 | B1* | 1/2001 | Tallman | B60R 25/102 340/426.2 |
| 7,242,306 | B2* | 7/2007 | Wildman | A61B 5/1113 340/539.16 |
| 7,391,975 | B2 | 6/2008 | Oettinger et al. | |
| 7,450,024 | B2* | 11/2008 | Wildman | A61B 5/1113 340/573.1 |
| 7,536,109 | B2 | 5/2009 | Hiraka | |
| 7,970,871 | B2* | 6/2011 | Ewing | G01D 21/00 702/104 |
| 8,139,945 | B1* | 3/2012 | Amir | H04B 10/1149 340/8.1 |
| 8,204,971 | B2 | 6/2012 | Ewing et al. | |

(Continued)

FOREIGN PATENT DOCUMENTS

WO 9515624 A1 6/1995

*Primary Examiner* — Hibret Woldekidan
(74) *Attorney, Agent, or Firm* — Maynard Cooper & Gale, P.C.; Jon E. Holland

(57) ABSTRACT

A wireless network has a plurality of nodes that are configured to communicate electrical signals via a backhaul channel in which messages hop from node-to-node through the network. The nodes have optical transmitters for communicating with tags via an optical channel that is time division multiplexed (TDM) among the nodes of the network. The nodes are configured to transmit an electrical synchronization signal via the backhaul channel and to synchronize transmissions for the optical channel based on the electrical synchronization signal. Thus, use of the backhaul channel to communicate the synchronization signal leverages the existing framework of the network in order to synchronize the optical transmitters without requiring specialized synchronization circuitry, and a robust TDM algorithm can be implemented for the optical channel with relatively low complexity and costs.

24 Claims, 7 Drawing Sheets

(56) References Cited

U.S. PATENT DOCUMENTS

| | | | |
|---|---|---|---|
| 8,218,971 B2* | 7/2012 | Preston | F41A 33/02 |
| | | | 398/127 |
| 8,559,464 B2 | 10/2013 | Caracas et al. | |
| 8,896,448 B2* | 11/2014 | Archer | G06Q 10/08 |
| | | | 235/375 |
| 9,219,984 B1* | 12/2015 | Amir | H04W 4/021 |
| 2003/0035426 A1* | 2/2003 | Tagore-Brage | H04L 49/254 |
| | | | 370/392 |
| 2005/0058149 A1* | 3/2005 | Howe | H04L 47/10 |
| | | | 370/428 |
| 2011/0134797 A1* | 6/2011 | Banks | H04W 40/246 |
| | | | 370/254 |
| 2011/0235560 A1* | 9/2011 | Kurita | G08B 17/00 |
| | | | 370/311 |

* cited by examiner

533

| 541 | 542 | 543 | 544 | 545 | 546 | 547 | 548 | 549 |
|---|---|---|---|---|---|---|---|---|
| 0 | 1 | 2 | 0 | 1 | 2 | 0 | 1 | 2 |

533

| 541 | 542 | 543 | 544 | 545 | 546 | 547 | 548 | 549 |
|---|---|---|---|---|---|---|---|---|
| 0 | 1 | 0 | 2 | 0 | 1 | 0 | 2 | 0 |

533

| | 562 | | 563 | | | 565 | | 566 |
|---|---|---|---|---|---|---|---|---|
| 0 | 1 | 0 | 2 | 0 | 1 | 0 | 2 |

SYSTEMS AND METHODS FOR SYNCHRONIZING OPTICAL TRANSMITTERS

RELATED ART

In an asset tracking system, an asset to be monitored is often coupled to a tag that wirelessly communicates with various nodes of a network as the asset moves about an area. Information from the tag is used by the network to determine the tag's location, and various actions may be taken based on such location. For example, access to a restricted area may be controlled based on the tag's location, or an alarm may be generated when the tag is determined to enter an unauthorized area.

To ensure adequate coverage for monitoring the tag, many nodes may be installed throughout the area where the tag is expected to move. However, when multiple nodes simultaneously transmit signals for reception by the tag, the transmitted signals may interfere with each other thereby preventing the tag from successfully receiving the signals. Such interference may result in undesirable performance problems and delays.

To help avoid or reduce interference, it is possible to time-division multiplex the transmissions from the nodes such that only one node is permitted to transmit to the tag at a time. However, implementing such time-division multiplexing (TDM) techniques can significantly increase the complexity and cost of the network, particularly for large networks. Indeed, to effectuate a TDM control algorithm, transmissions from the potentially-interfering nodes should be synchronized, and maintaining synchronization among the nodes can be problematic or difficult, sometimes requiring specialized circuitry.

For such reasons or otherwise, many developers elect to implement a tracking system without synchronizing the network nodes or attempting to time-division multiplex the communications between the nodes and the tags. Such networks can experience increased performance problems during operation, such as delays or errors, resulting from signal interference.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

Figure 1:
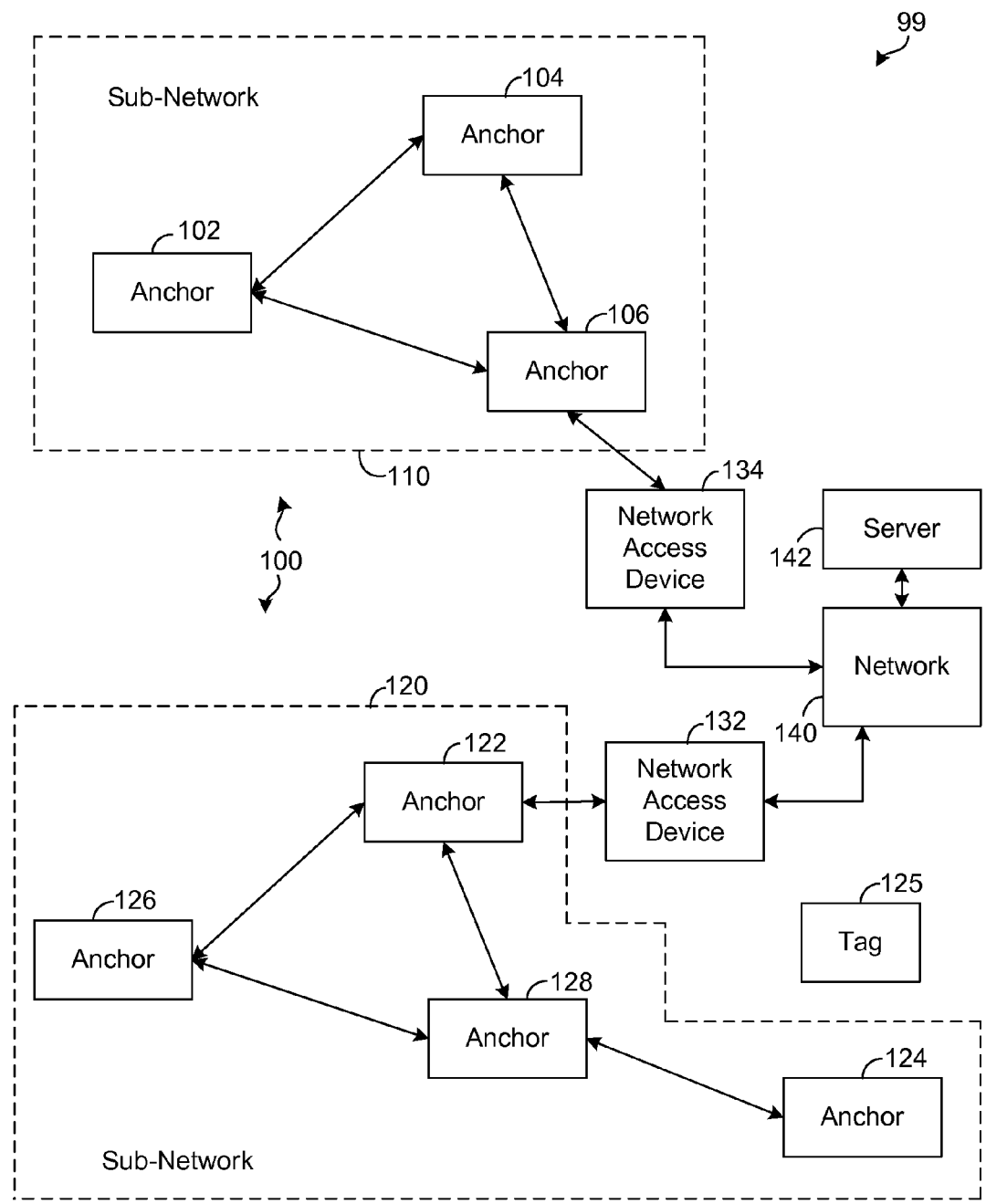
FIG. 1 is a block diagram illustrating an exemplary embodiment of a wireless communication system.

The present disclosure generally pertains to systems and methods for synchronizing optical transmitters in wireless communication systems. In one exemplary embodiment, nodes of a wireless network are dispersed throughout a facility or other premises for tracking multiple assets (e.g., personnel or objects) as they move within the facility. Within the network, wireless optical transmitters of multiple network nodes may be within one room or area such that an optical receiver is within the line of sight of multiple transmitters. When the optical transmitters simultaneously transmit, interference may occur, thereby negatively impacting the performance of the network. Herein, various methodologies are disclosed for reducing interference between optical transmitters that are within line of sight of an optical receiver.

In one embodiment, the wireless network comprises electrical sub-networks in which network nodes communicate with each other via wireless electrical signals, such as radio frequency (RF) signals. Certain mobile nodes, referred to herein as "tags," are attached to or carried by movable assets being monitored. Other nodes, referred to herein as "anchors," have optical transmitters that communicate with the tags via an optical channel. Information about the tags or parameters sensed by the anchors are transmitted by the anchors via a backhaul channel through at least one electrical sub-network to a server. In addition, the server may transmit information or commands via the backhaul channel to the anchors.

For each electrical sub-network, a synchronization signal for synchronizing the optical transmitters within the sub-network is transmitted through the backhaul channel to the anchors. Each of a group of anchors uses the synchronization signal in order to synchronize its optical transmitter according to a time-division multiplexing (TDM) algorithm. In this regard, the optical channel is segmented into frames, and each optical transmitter is assigned one or more time slots in a frame such that only one anchor at a time is permitted to transmit via the optical channel. Further, the timing of the frame is marked by the synchronization signal. For example, each optical transmitter may determine the start of a frame based on the synchronization signal so that the optical transmitters are synchronized relative to one another.

In one exemplary embodiment, the synchronization signal is a multicast message that is broadcast through the electrical sub-network such that each anchor of the sub-network receives the message almost simultaneously, and the optical transmitter of a given anchor may determine the timing of a frame based on when the multicast message is received by the anchor. For example, the optical transmitter of an anchor may determine that a new frame starts when the multicast message is received by the anchor or after some predefined delay after receiving the multicast message. The optical transmitters of the other anchors within the electrical sub-network may similarly mark the start or other portion of the frame so that the optical transmitters are synchronized for the frame.

The use of the electrical backhaul channel to communicate the synchronization signal leverages the existing framework of the wireless network in order to synchronize the optical transmitters without requiring specialized synchronization circuitry or communication among the optical transmitters to achieve the synchronization. Thus, a robust TDM algorithm can be implemented with relatively low complexity and costs.

In another embodiment, certain anchors that are continuously powered with alternating current (AC) are permitted to transmit more frequently and/or for a longer duration than other anchors that are battery powered. As an example, the optical transmitter of an anchor powered by an AC power signal may be permitted to transmit via the optical channel in each of a plurality of intervals between time slots that have been respectively allocated to a plurality of battery-powered anchors, as will be described in more detail hereafter.

FIG. 1 depicts an exemplary embodiment of an asset tracking system 99, which comprises a wireless network 100 having a plurality of nodes that may be employed at a facility, such as an airport, hospital, university, warehouse, or other location, for example. In the exemplary embodiment shown by FIG. 1, the nodes are stationary and shall be referred to hereafter as "anchors," but any of the nodes may be mobile in other embodiments. FIG. 1 depicts seven anchors 102, 104, 106, 122, 124, 126, and 128 for simplicity, but the network 100 may have any number of anchors or other types of nodes in other embodiments. In one exemplary embodiment, the network 100 is implemented as a mesh network, but other types of networks may be implemented in other embodiments. One or more networks are described in commonly-assigned U.S. Pat. No. 7,970,871, entitled "Systems and Methods for Dynamically Configuring Node Behavior in a Sensor Network," and filed on May 2, 2008, which is incorporated herein by reference in its entirety.

Each anchor is able to communicate with any of the other anchors. In one exemplary embodiment, the anchors communicate among one another wirelessly, but it is possible for any of the anchors to communicate with any of the other anchors over a conductive medium or otherwise. Messages may hop from anchor-to-anchor in order to reach a destination. For example, in the illustrative embodiment shown by FIG. 1, the anchors 122, 126, and 128 are within range of each other such that any of the anchors 122, 126, and 128 can communicate directly with any of the other anchors 122, 126, and 128. However, the anchor 124 is only within range of anchor 128. The other anchors 122 and 126 can use the anchor 128 to communicate a message to anchor 124. In one exemplary embodiment, each anchor has a routing table that indicates designated routes for messages, and as is known in the art routing tables can be created and updated via a variety of techniques. In general, anchors communicate among one another to learn of data paths for various destinations. Once a path to a particular destination is discovered, the routing table or tables of the anchors along the path may be updated and later used to route a unicast message to the destination.

As known in the art, a unicast message is a message that is routed to a particular node (e.g., anchor) identified by the message. In this regard, each unicast message includes a source address indicating the network address of the node from which the message originated and a destination address indicating the network address of the node that is to receive the message. The unicast message also includes a next-hop address identifying the next node that is to receive the message as it is progressing toward the destination node. The nodes communicate with one another to learn routes through the network, and the nodes' routing tables are updated to indicate the learned routes. Based on these routing tables, a unicast message hops through the network, node-by-node, until the message reaches its identified destination. When a node receives a unicast message, the node will process the unicast message only if it is identified by the message's next-hop address or destination address. In such case, before re-transmitting the message, the node uses its routing table to determine the next hop for the message and updates the next-hop address in the message so that it identifies the next node that is to receive the message, assuming that the message has yet to reach its destination.

Multicast messages, on the other hand, are usually not forwarded based on routing tables but are instead rebroadcast by nodes that receive it. In this regard, each multicast message includes a source address indicating the network address of the node from which the message originated. Rather than having a destination address identifying a single destination node, a multicast message often has a group identifier identifying a group of nodes that are to receive and process the message. One type of message, referred to as a "broadcast" message, is to be processed by all of the nodes that receive it. Generally, each node that receives the multicast message re-transmits the multicast message so that it can be heard by the other nodes within range of the transmitting node. Thus, the multicast message should eventually reach each node within the identified multicast group. The multicast message typically has a time-to-live value that is decremented each time it is retransmitted, and the nodes stop re-transmitting the multicast message once this value falls below a threshold. Such practice eventually stops propagation of the multicast message so that it is not re-transmitted in perpetuity. If desired, parameters (e.g., time-to-live value and multicast group identifier) in the header of a multicast message can be set such that the multicast message reaches each node of the network 100 or any group of nodes within the network 100, such as at least the anchors of a particular sub-network 110 or 120. If desired, a multicast message may have a destination address identifying a single node. In such case, the message is rebroadcast through the network 20, and the node identified as the message's destination further processes the message as may be desired, whereas the other nodes that receive the message only re-transmit the message.

In one exemplary embodiment, the nodes of the system 99 are designed to communicate only multicast messages. That is, unicast messages are not used, and there is no need for the nodes to build routing tables. Such an embodiment can significantly reduce congestion and data collisions since it is unnecessary for the nodes to communicate additional messages for discovering routes through the network. For illustrative purposes, it will be assumed hereafter that the nodes of the network 99 communicate only multicast message unless otherwise indicated herein.

As illustrated by FIG. 1, the anchors may be arranged in groups, referred to herein as "sub-networks." FIG. 1 shows two sub-networks 110 and 120, but any number of sub-networks is possible. In particular, sub-network 120 includes anchors 122, 124, 126, and 128, while sub-network 110 includes anchors 102, 104, and 106. Each sub-network 110 and 120 has a respective network access device 132 or 134 through which the anchors of the sub-network use to access a network 140, such as a local area network (LAN) and/or wide area network (WAN). Each network access device 132 and 134 is communicatively coupled to the network 140 and interfaces messages between the protocol of the sub-networks 110 and 120 (i.e., the communication protocol used to communicate messages among the anchors) and the protocol of the network 140. As an example, in one embodiment, the network 140 employs Transmission Control Protocol/Internet Protocol (TCP/IP), and each network access device 132 and 134 encapsulates messages received from its respective sub-network 110 or 120 in accordance with TCP/IP for communication through the network 140. Thus, for each message received from the sub-network 120, the network access device 134 may be configured to encapsulate such message in accordance with TCP/IP thereby defining an IP packet in which the received message of sub-network 120 defines the payload of the IP packet. If desired, a network access device 132 or 134 may de-encapsulate the messages received from its respective sub-network 110 or 120 to strip away various header information before encapsulating the messages for communication through the network 100, but such de-encapsulation is unnecessary.

In the opposite direction, each network access device 132 and 134 de-encapsulates messages from the network 140 to strip away header information associated with the protocol of the network 140, thereby recovering the payload data carried by such messages. If the payload data defines a message that is already compatible with the protocol of the sub-network 110 and 120, the network access device 132 or 134 may simply transmit the message to an anchor or other node of its respective sub-network 110 or 120. Otherwise, the network access device 132 or 134 may encapsulate the recovered data in accordance with the protocol of the sub-networks 110 and 120 or otherwise add header information before transmitting the message to an anchor.

Note that the anchors of the different sub-networks 110 and 120 are members of the same wireless network 100, and an anchor of one sub-network 110 or 120 may reach an anchor of another sub-network. However, one sub-network may be located in a geographic region outside of the range of anchors in another sub-network such that direct communication between the two sub-networks is not possible. In such a case, messages may pass through the network 140. As an example, the anchor 122 may transmit a message through the network access device 132, network 140, and network access device 134 to the anchor 106. In another embodiment, the network 140 is coupled to a server 142 that is configured to manage traffic between sub-networks 110 and 120. In this regard, the server 142 is configured to store a table (not shown in FIG. 1) having a list of network addresses for the anchors in the network 100. The server 142 may perform a topology discovery process to learn the presence of the anchors and to learn associations between the anchors and their respective network access device. As an example, the server 142 learns that anchors 122, 124, 126, and 128 are serviced by the network access device 132 and that the anchors 102, 104, and 106 are serviced by the network access device 134.

In one exemplary embodiment, the server 142 may be assigned an address of the network 100 and function as one of the nodes of the network 100 such that unicast messages (if used) may be routed through the server 142 and multicast messages may pass through the server 142. For example, when the server 142 receives a multicast message from a network access device 132 or 134, the server 142 may transmit such multicast message through the network 140 to each remaining network access device of which the local server 142 is aware.

Thus, the server 142 may be the next hop for a message from either of the network access devices 132 or 134. In one embodiment, the server 142 is provisioned to know the network configuration, including the network address of the anchors and other nodes of the network 100. In other embodiments, the server 142 may be configured to dynamically learn the network configuration. As an example, each anchor may be configured to join the network 100 and to transmit a message announcing its presence, referred to hereafter as an "anchor discovery message." Such message may be a multicast message that is communicated through network 100, including the server 142. In this regard, the server 142 may discover the presence of an anchor and/or its associations with its respective network access device 132 or 134 based on the anchor discovery message transmitted by the anchor upon joining the network 100. For example, based on the anchor discovery message originating from the anchor 124, the server 142 can learn the anchor's network address and determine that it is associated with the network access device 132 since the server 142 receives the anchor discovery message from this network access device 132. Thus, later, if the server 142 is to transmit a message to the anchor 124, the server 142 is aware that the message can reach the anchor 124 through the network access device 132.

When the source node of a unicast message is in one sub-network and the destination node is in another sub-network, the message may be communicated to the server 142, which then forwards the message to the appropriate network access device 132 or 134 for communication to the destination node. In the example described above where the anchor 122 is transmitting a message to the anchor 106, the message may be received by the server 142, which based on the message's destination address forwards the message to the network access device 134 through the network 140. Alternatively, the anchor 122 may transmit a multicast message to the anchor 106 by specifying a time-to-live value that is sufficiently large such that the message eventually reaches the anchor 106 as it is re-transmitted by the nodes that receive it. In other embodiments, other techniques for communicating messages among anchors or nodes within a wireless sensor network are possible.

Each anchor may be positioned at a specific location within a facility, such as a patient room at a hospital. In one embodiment, each anchor is mounted on a wall within a room or hall of a healthcare facility, although it is possible for any anchor to be mounted or otherwise positioned at a different location.

As shown by FIG. 1, the wireless network 100 comprises at least one mobile node 125, referred to herein as a "tag," that is configured to wirelessly communicate with one or more anchors as the tag 125 is moved through the facility or other location at which the anchors are situated. The tag 125 is preferably attached to an asset (such as a person or object) to be monitored in order to track movements of the asset, as will be described in more detail hereafter. In one exemplary embodiment, the tag 125 is a node of the wireless network 100 but is not configured to route messages through the network 100. That is, the tag 125 may transmit a network message, for example, to an anchor for communication of the message through the network 100. Also, the tag 125 may receive network messages from one or more anchors. However, the tag 125 does not serve as an intermediate hop for messages, including both unicast and multicast messages. Preventing the tag 125 from performing routing functions helps to conserve the tag's power. In this regard, not only are the tag's functions reduced, but the tag may sleep from time-to-time while the anchors remain operational for routing functions.

As an example, from time-to-time, the tag 125 may be configured to transition to a sleep state, in which components of the tag 125 are deactivated so that the tag 125 consumes less power. In particular, the tag's communication components may be deactivated such that the tag 125 is unable to communicate with external devices while in a sleep state. If desired, the tag 125 may be configured to periodically awaken from its sleep state, briefly communicate with at least one anchor so that its location can be discovered and information can be exchanged for a brief period of time, and then transition back to a sleep state. Thus, the tag 125 can be configured to spend a significant amount of time in a sleep state such that the useful life of the tag's batteries is significantly extended.

Anchors and tags such as those shown in FIG. 1 may include hardware, software, and/or firmware for performing the functions described herein for such anchors and tags. In addition, any anchor or tag may have one or more sensors for sensing one or more parameters. A more specific description of exemplary embodiments of nodes, such as anchors or tags, can be found in commonly-assigned U.S. Patent Application No. 61/835,935, entitled "Systems and Methods for Monitoring Compliance with Hand Washing Policies" and filed on Jun. 17, 2013, which is incorporated by reference herein in its entirety. Additionally, exemplary network communication techniques and network configurations are further described in commonly-assigned U.S. Pat. No. 8,204,971, entitled "Systems and Methods for Dynamically Configuring Node Behavior in a Sensor Network" and filed on May 24, 2011, which is incorporated by reference herein in its entirety.

Figure 2:
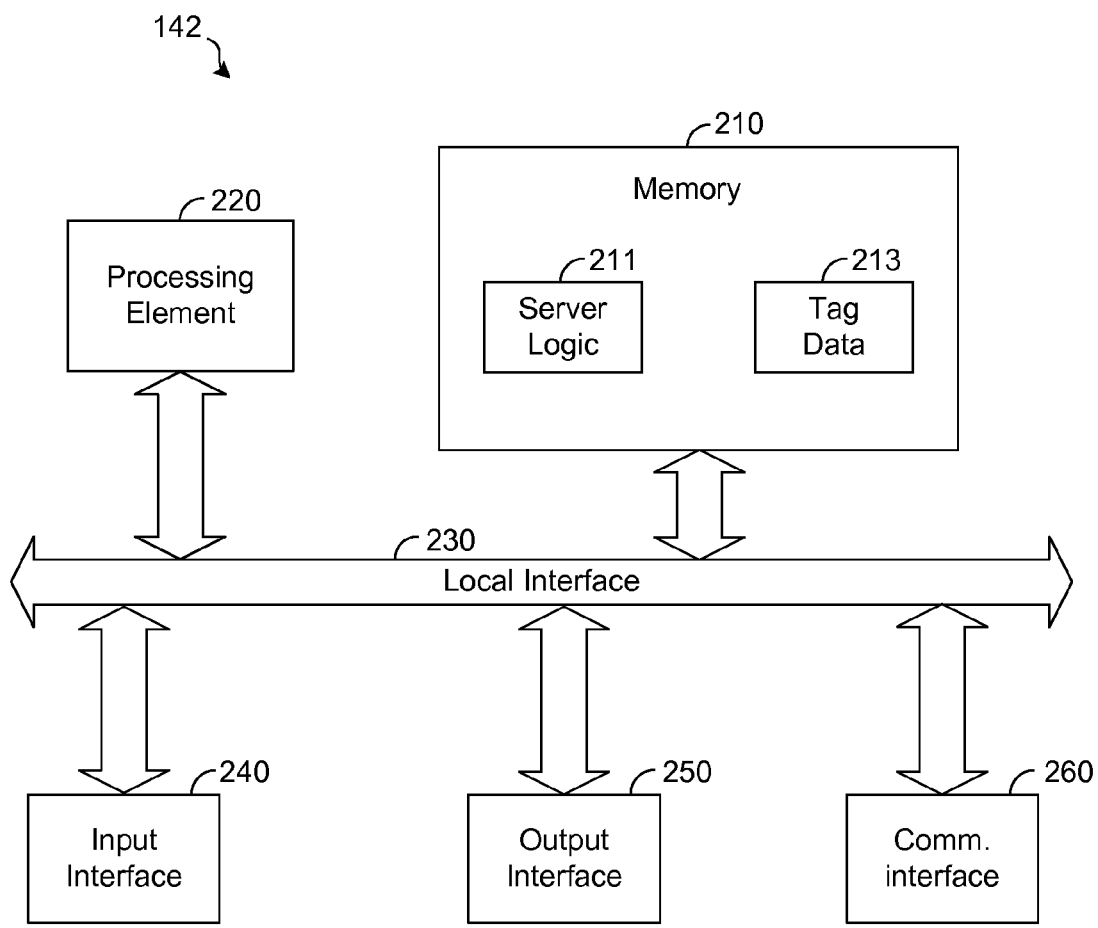
FIG. 2 is a block diagram illustrating an exemplary embodiment of a server, such as is depicted by FIG. 1.

FIG. 2 depicts one illustrative embodiment of the server 142. As shown by FIG. 2, the server 142 comprises server logic 211 for generally controlling the operation of the server 142, as will be described in more detail hereafter. The server logic 211 can be implemented in software, hardware, firmware or any combination thereof. In the server 142 illustrated by way of example in FIG. 2, the server logic 211 is implemented in software and stored in memory 210 of the server 142.

Note that the server logic 211, when implemented in software, can be stored and transported on any computer-readable medium for use by or in connection with an instruction execution apparatus that can fetch and execute instructions. In the context of this document, a "computer-readable medium" can be any means that can contain or store code for use by or in connection with an instruction execution apparatus.

The server 142 depicted by FIG. 2 comprises at least one conventional processing element 220, such as a digital signal processor (DSP) or a central processing unit (CPU), for executing instructions that are stored in memory 210. The processing element 220 communicates to and drives the other elements within the server 142 via a local interface 230, which can include one or more buses. Furthermore, an input interface 240, for example, a keypad, microphone, touchscreen, keyboard or a mouse, can be used to input data from a user of the server 142, and an output interface 250, for example, a printer, monitor, liquid crystal display (LCD), organic light emitting diode (OLED) display, or other display apparatus, can be used to output data to a user. Furthermore, a communication interface 260, such as a modem, may be used to exchange data with the network 140.

As will be described in more detail hereafter, the anchors 102, 104, 106, 122, 124, 126, and 128 are configured to communicate with the tag 125 as it moves. Such anchors transmit information about the tag 125 via a backhaul channel to the server 142, and the server logic 211 stores in memory 210 tag data 213 based on such information. For example, the server logic 211 may determine the location of the tag 125 based on the information from the anchors and store coordinates or other values indicative of the tag's location in the tag data 213. The backhaul channel is used for communicating messages among the anchors, including messages communicated between the anchors and the server 142. Indeed, the backhaul channel is used for routing unicast messages among the anchors and for transmitting multicast messages to groups of anchors. As will be described in more detail hereafter, communication between the tags 125 and anchors 102, 104, 106, 122, 124, 126, and 128 occurs via one or more other channels.

The server logic 211 is further configured to make decisions based on the tag's location and to control at least one component of the wireless network 100 based on the tag's location. As an example, the server logic 211 may transmit a control message via the backhaul channel to at least one anchor, which forwards the message to the tag 125 for controlling the tag 125. For example, the server logic 211 may transmit a message instructing the tag 125 to provide an output to a user for informing the user of an event that is based on the tag's location. In one embodiment, the tag 125 is attached to an article of merchandise in a retail environment. If the article of merchandise is moved to an unauthorized location, the server logic 211 transmits a control message for causing the tag 125 to emit an alarm, such as a sound, vibration, or light. In another embodiment, the tag 125 is attached to a caregiver, such as a nurse or doctor, in a healthcare facility. Based on the tag's location and possibly other information, the server logic 211 determines when the caregiver enters a patient's room and approaches the patient without washing his or her hands. In such event, the server logic 211 transmits a control message for causing the tag 125 to emit an alarm, such as a sound, vibration, or light.

It should be emphasized that the retail and healthcare applications described above are exemplary, and the network 100 can be used in various other applications. Indeed, in other embodiments, tracking of the tag's location is unnecessary, and other types of information about the tags 125 or other components of the system 99 may be communicated via the backhaul channel to the server 142 and/or among the anchors.

Figure 3:
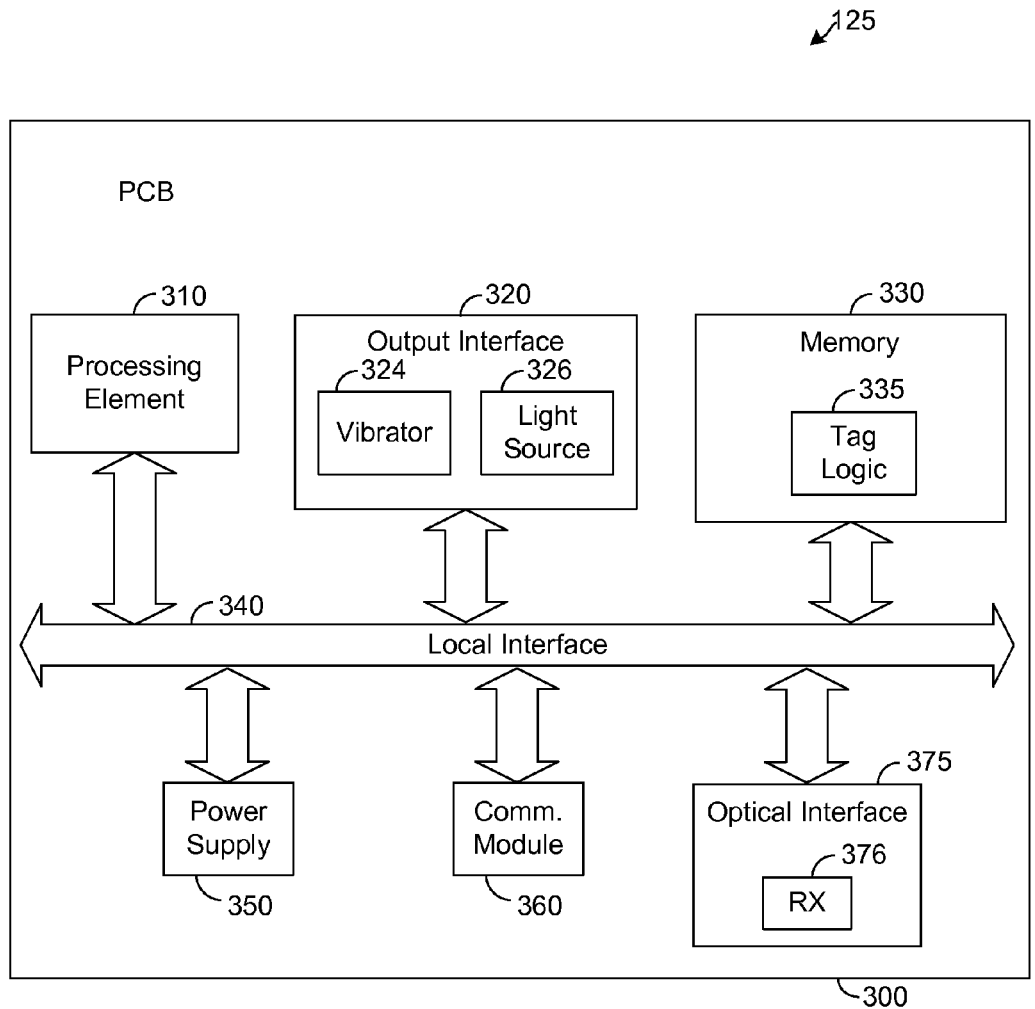
FIG. 3 is a block diagram illustrating an exemplary embodiment of a tag, such as is depicted by FIG. 1.

FIG. 3 depicts one exemplary embodiment of a tag 125. As shown by FIG. 3, the tag 125 comprises tag logic 335 for generally controlling the operation of the tag 125. The tag logic 125 can be implemented in software, hardware, firmware or any combination thereof. In the illustrative tag 125 shown by FIG. 3, the tag logic 125 is implemented in software and stored in memory 330. Note that the tag logic 335, when implemented in software, can be stored and transported on any computer-readable medium for use by or in connection with an instruction execution apparatus that can fetch and execute instructions.

The tag 125 depicted by way of example in FIG. 3, comprises at least one conventional processing element 310, such as a digital signal processor (DSP) or a central processing unit (CPU), for executing instructions that are stored in memory 330. The processing element 310 communicates to and drives the other elements within the tag 125 via a local interface 340, which can include one or more buses. In addition, the tag 125 has a communication module 360, which comprises an RF radio or other wireless communication device for communicating wirelessly. The tag 125 also has a power supply 350, such as one or more batteries, which provide electrical power to the components of the tag 125.

As shown by FIG. 3, the tag 125 has an output interface 320 that is configured to provide outputs to a user. The output interface 320 depicted by FIG. 3 comprises a vibrator 324 and a light source 326, such as a light emitting diode (LED), but other types of output devices (e.g., a speaker for audible output) are possible in other embodiments. When the tag logic 335 receives a control message for causing the tag 125 to emit an alarm, as described above, the tag logic 335 is configured to activate the vibrator 324 and/or light source 326. In other embodiments, the tag logic 335 may control other components in other ways in order to provide an alarm or perform other functions as may be desired. In one embodiment, each component shown by FIG. 3 resides on and is integrated with a printed circuit board (PCB) 300. However, in other embodiments, other arrangements of the tag 125 are possible, as well as other electronic mounting surfaces.

The tag 125 also has an optical interface 375 that is configured to communicate optically with devices external to the tag 125, such as anchors. In one embodiment, the optical interface 375 is configured to communicate infrared signals but optical signals of other wavelengths may be communicated in other embodiments. The optical interface 375 may comprise an optical transmitter (not specifically shown in FIG. 3) for transmitting a wireless optical signal (e.g., infrared), and the optical interface 375 may comprise an optical receiver (RX) 376 for receiving an optical signal (e.g., infrared).

Figure 4:
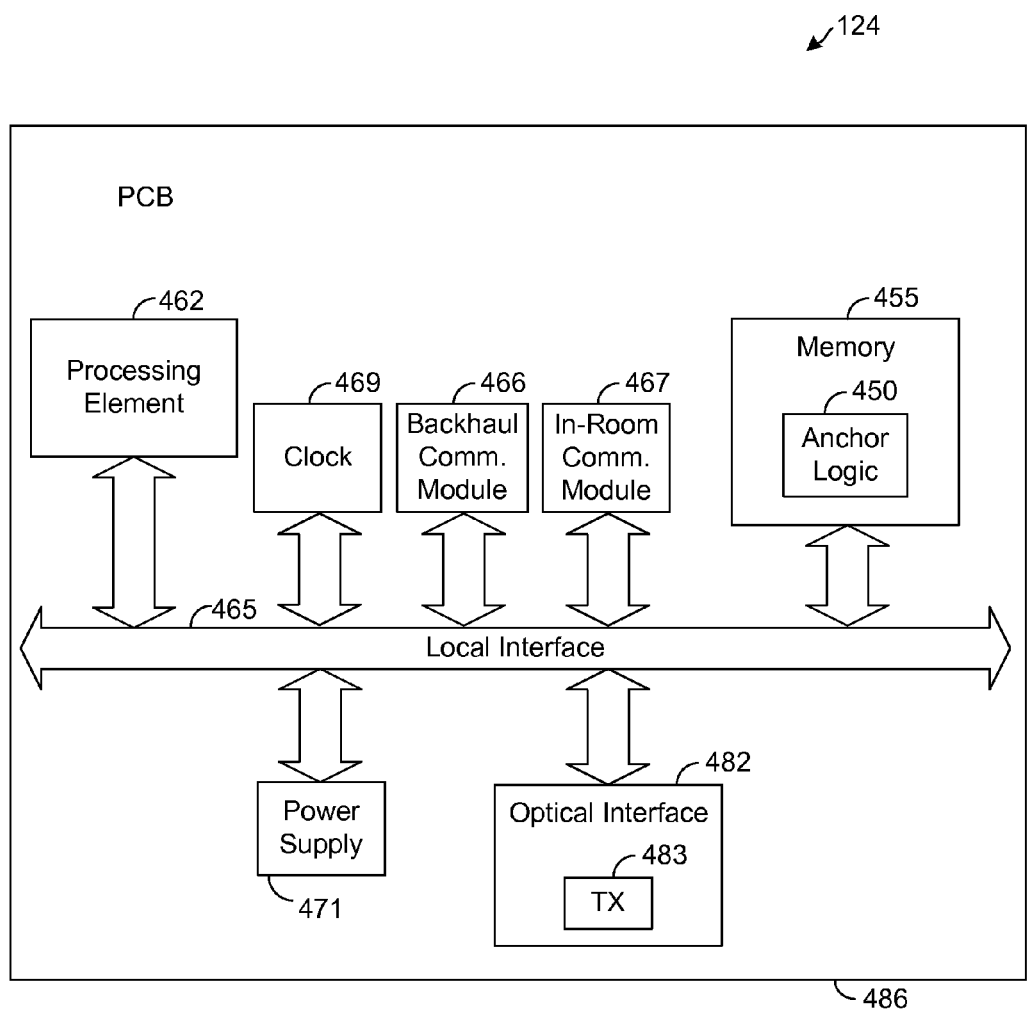
FIG. 4 is a block diagram illustrating an exemplary embodiment of an anchor, such as is depicted by FIG. 1.

FIG. 4 depicts an illustrative embodiment of one of the anchors 124. Note that any of the other anchors 122, 126, and 128 in sub-network 110 or anchors 102, 104, and 106 in sub-network 120 may be configured similar or identical to the anchor 124 depicted by FIG. 4. The exemplary anchor 124 shown by FIG. 4 comprises anchor logic 450, which may be implemented in software, firmware, hardware, or any combination thereof. In FIG. 4, the anchor logic 450 is implemented in software and stored in memory 455. Note that the anchor logic 450, when implemented in software, can be stored and transported on any computer-readable medium for use by or in connection with an instruction execution apparatus that can fetch and execute instructions.

The illustrative example of the anchor 124 depicted by FIG. 4 includes at least one conventional processing element 462, such as a digital signal processor (DSP) or a central processing unit (CPU), for executing instructions that are stored in memory 455. The processing element 462 communicates to and drives the other elements within the anchor 124 via a local interface 465, which can include one or more buses. The anchor 124 has a clock 469, which can be used to track time and control signaling.

The anchor 124 also has a plurality of communication modules 466 and 467. Each of the modules 466 and 467 comprises a radio frequency (RF) radio or other wireless communication device for communicating wirelessly. One of the modules 466, referred to herein as "backhaul communication module," is used for communicating with the other anchors and the server 142. As an example, referring to FIGS. 1 and 4, a message destined for the server 142 may be wirelessly transmitted by the backhaul communication module 466 of the anchor 124 to the network access device 132, which encapsulates the message for transmission through the network 140 to the server 142, if the communication protocol of the sub-network 120 is different than the protocol of the network 140. In the opposite direction, a message from the server 142 destined for the anchor 124 is communicated via the network 140 to the network access device 132. If the protocol of the network 140 is different than the protocol of the sub-network 120, the message is encapsulated in accordance with the protocol of the network 140, and the network access device 132 strips the overhead of network 140 from the message before transmitting it to the anchor 122. In any event, the message is wirelessly communicated via the anchors 122 and 128 to the backhaul communication module 466 of the anchor 124.

The communication module 467, referred to hereafter as "in-room communication module," is used for wirelessly communicating with tags 125. Thus, when the backhaul communication module 466 receives a message destined for a tag 125 that is within communication range of the in-room communication module 467, the anchor logic 450 may be configured to transmit the message via the in-room communication module 467 to the tag 125. If the tag 125 is not within communication range of the in-room communication module 467, the anchor logic 450 may be configured to transmit the message via the backhaul communication module 466 so that the message hops via the backhaul channel to another anchor that may be able to communicate the message with the tag 125.

In one embodiment, the backhaul channel used by the module 466 is at a frequency different than the frequency of the communication channel, referred to herein as "in-room channel," used by the module 467. Thus, the signals transmitted by the backhaul communication module 466 are separated in frequency relative to the signals communicated by the in-room communication module 467 such that the signals of the backhaul channel do not interfere with the signals of the in-room channel.

The anchor 124 has a power supply 471, which provides electrical power to the components of the anchor 124. For example, in one embodiment, the power supply 471 comprises batteries that provide a direct current (DC) power signal for powering components of the anchor 124. In another embodiment, the power supply 471 comprises an alternating current (AC) interface that converts an AC signal received from an external source, such as a wall plug, into a DC signal for powering the components of the anchor. As an example, it is common for an AC signal of 120 Volts and 60 Hertz to be available in North America. The power supply 471 may be configured to convert such signal to a lower voltage (e.g., 5 to 10 Volts) DC signal for powering the components of the anchor 124. In other embodiments, other types of AC signals may be received and converted by the power supply 471. An anchor that receives an external AC power signal and converts such signal to a DC power signal for powering components of the anchor shall be referred to herein as an "AC anchor." An anchor that has a DC power source, such as batteries, for generating a DC power signal or that receives a DC power signal from an external DC power source shall be referred to herein as a "DC anchor."

As shown by FIG. 4, the anchor 124 also has an optical interface 482 that is configured to communicate optically with devices external to the anchor 124, such as tags 125. In one embodiment, the optical interface 482 is configured to communicate infrared signals, but optical signals of other wavelengths may be communicated in other embodiments. The interface 482 may comprise an optical transmitter (TX) 483 for transmitting an optical signal (e.g., infrared), and the interface 482 may comprise an optical receiver (not specifically shown in FIG. 4) for receiving a wireless optical signal (e.g., infrared). In one illustrative embodiment, each component shown by FIG. 4 resides on and is integrated with a printed circuit board (PCB) 486. However, in other embodiments, other electronic component arrangements of the anchor 124 are possible and contemplated as well.

Note that the optical interface 482 provides an optical communication channel that is separate from the backhaul and in-room channels provided by the modules 466 and 467, respectively. As an example, the optical signals communicated by the interface 482 may be used to assist with tracking of the tags 125. In this regard, the signal strength of an optical signal communicated between the interface 482 and a tag 125 may be measured and used to determine the tag's location. For example, the measured signal strength may be reported to the server 142, and the server logic 450 may be configured to estimate a distance between the tag 125 and anchor 124 based on the signal strength. By estimating the distances between the same tag 125 and multiple anchors, the server logic 450 can use triangulation or some other algorithm to determine the tag's precise location. In other examples, the optical channel may be used as a data channel for conveying information useful in determining the tag's location or for other purposes.

As an example, the optical transmitter 483 may be configured to modulate an optical signal with data in order to convey such data wirelessly to the tag 125. In one embodiment, the data defines a room identifier that is unique to the room or other area in which the anchor 124 is situated or transmitting. Indeed, when the optical receiver 376 of a tag 125 receives the modulated optical signal, the tag 125 can identify the room or area in which it is located or at least to which it is close. In this regard, optical signals are limited by line of sight and, specifically, are blocked by structures such as walls. Thus, if the anchor 124 is situated in a room of a building, then it is likely that the tag 125 is in the same room or is at least close to (e.g., in the adjacent room or hallway) this same room when it is receiving the room's identifier from such anchor 124.

In one exemplary embodiment, anchors are situated in different rooms of a building, and each anchor optically transmits the room identifier of the room in which it is situated. If the tag 125 receives only one room identifier, then the tag 125 assumes that it is located in the room identified by the received identifier. If a tag 125 is receiving multiple room identifiers, then other information (e.g., signal strength) may be used to help resolve in which room the tag 125 is located. In any event, the optical signal transmitted by the optical transmitter 483 conveys location information to the tag 125, and this location information can be used to help determine the tag's current proximity.

In one exemplary embodiment, when a tag 125 receives a room identifier from the optical transmitter 483, the tag logic 335 transmits a message (referred to hereafter as a "tag location message") indicative of the room identifier via the in-room channel to at least one anchor, which could be the same anchor or a different anchor from which the room identifier was optically received. Such receiving anchor forwards the message via the backhaul channel to the server 142. Note that such tag location message may include both the room identifier and an identifier (e.g., network address) of the tag 125. For example, the message may include the room identifier as payload, and the overhead of the message may have a source address identifying the tag 125. Based on such identifiers, the server logic 211 determines that the identified tag is in the identified room. Therefore, based on the room identifier optically transmitted from the optical transmitter 483 of the anchor 124 to the optical receiver 376 of the tag 125, the server 142 determines the approximate location of the tag 125 and can then make control decisions based on such location, as described above. In other embodiments, other types of information may be optically communicated between the anchor 124 and the tag 125 as may be desired.

As described above, any anchor that receives the tag location message can transmit such message via the backhaul channel to the server 142. However, in an effort to reduce network traffic, the system 99 is configured such that only one anchor responds to the tag's location message. In this regard, for each room, there is a single anchor configured to handle backhaul communications with the server 142. Such anchor is configured to communicate with other nodes in the same room, such as other anchors or tags, via the in-room channel or otherwise and to serve as a proxy for communicating with the server 142 on behalf of these nodes. When such anchor receives a tag location message, it responds to the message only if the room identifier in the message identifies the same room in which the anchor is located. Thus, for any given tag location message, there should only be one anchor that responds by transmitting the message to the server 142. In this regard, if another anchor in another room receives the same message, such other anchor should ignore the message since it does not identify the anchor's room. Accordingly, the overall traffic communicated across the network 100 is reduced. In other embodiments, other network configurations are possible, and multiple anchors may be configured to respond to a given tag location message.

Figure 5:
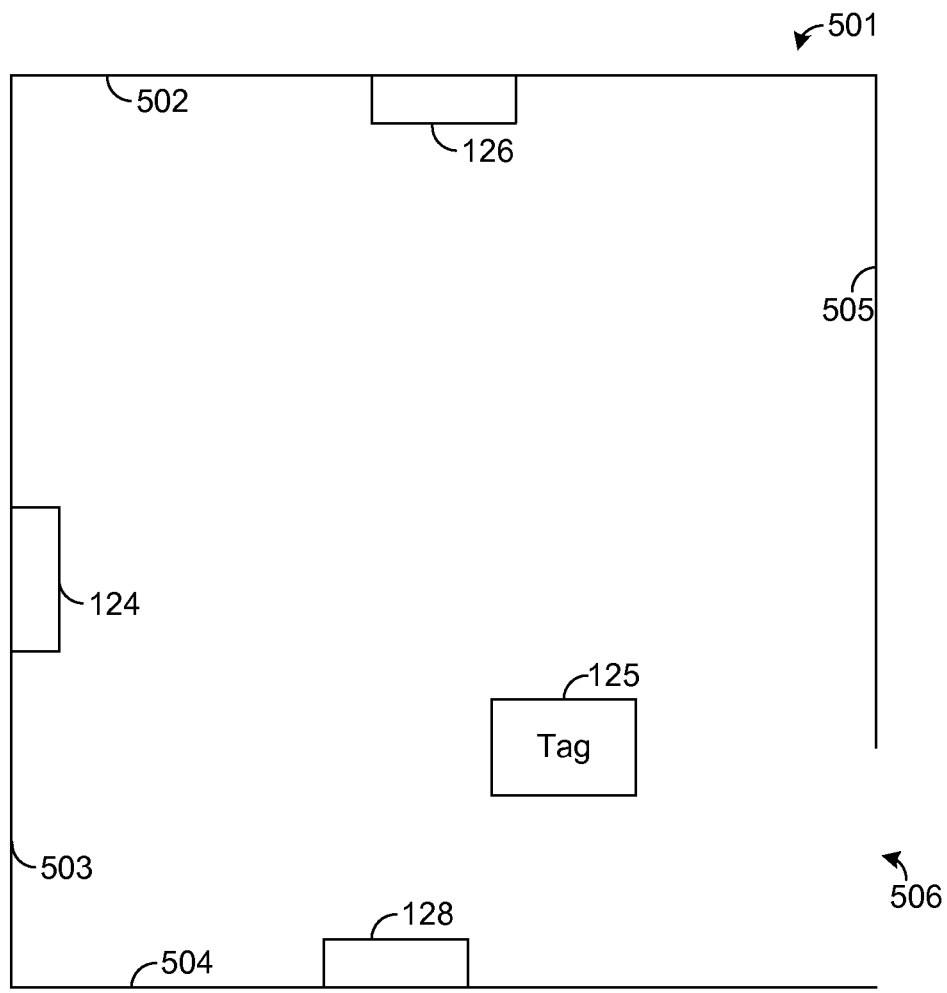
FIG. 5 is a block diagram illustrating an exemplary room in which nodes of a wireless network, such as is depicted by FIG. 1, are situated.

To increase the likelihood that the tag 125 receives light from at least one anchor when entering a room or other area, it may be desirable to situate more than one anchor in the room or other area. For example, FIG. 5 shows a room 501 having four walls 502-505 with a doorway 506 between walls 504 and 505. In the example shown by FIG. 5, anchors 126, 124, and 128 are mounted on the walls 502-504, respectively. Thus, with multiple anchors 124, 126, and 128 at different directions relative to the tag 125, there is a higher probability that, at any given instant, the tag 125 is likely facing at least one anchor 124, 126, or 128 within the room 501. Further, if an object blocks the line of sight from the tag 125 to any one anchor 124, 126, or 128, it is possible that a line of sight exists with another anchor within the same room 501. Thus, having multiple anchors 124, 126, and 128 in the same room 501 helps to ensure that the tag 125 is able to optically communicate with at least one anchor 124, 126, or 128 within the room 501 and, thus, receive the room's identifier or other information optically transmitted by the anchors.

However, if the anchors 124, 126, and 128 are optically transmitting at the same wavelength, then it is possible for interference to occur. In this regard, if the optical receiver 376 (FIG. 3) of the tag 125 simultaneously receives optical signals from multiple anchors 124, 126, and 128, then the tag 125 may be unable to successfully read the signals.

In an effort to avoid interference, it is possible for each anchor 124, 126, and 128 to be configured to transmit optical signals periodically with randomized or different offsets. For example, after each optical transmission by the optical transmitter 483 (FIG. 4) of the anchor 124, the optical transmitter 483 may wait a predetermined amount of time before attempting to transmit again. During such period of non-transmission, other anchors 126 and 128 in the same room 501 may successfully transmit to the tag 125 free of interference from the anchor 124. If each of the other anchors 126 and 128 is similarly configured to have periods of non-transmission between periods of transmission, then it is more likely that at least one anchor 124, 126, or 128 will successfully reach the tag 125 such that the tag 125 eventually receives the room identifier after entering the room 501. However, in such a scheme, optical interference is nevertheless possible and will likely occur in a random fashion depending on the transmission patterns and algorithms employed by the individual anchors 124, 126, and 128 if there is no coordination or synchronization among the nodes 124, 126, and 128. Indeed, due to optical interference among the anchors 124, 126, and 128, there may be a finite and undesirable delay between the tag 125 entering the room 501 and the tag 125 successfully receiving a room identifier from one of the anchors 124, 126, or 128. During such delay, incorrect location decisions may be made due, at least in part, to the inability of the tag 125 to receive an optical transmission from at least one anchor 124, 126, or 128.

In one exemplary embodiment, the optical channel is time-division multiplexed in the downstream direction (i.e., from the anchors 124, 126, and 128 to the tag 125) in order to prevent interference among the anchors 124, 126, and 128. In this regard, according to a time-division multiplexing (TDM) algorithm, only one anchor 124, 126, or 128 in the same room 501 is permitted to transmit at a time such that optical transmissions within line of sight of the tag 125 are prevented from interfering with each other. For example, in one exemplary embodiment, the optical channel is segmented into frames, and each anchor in the room 501 is assigned one or more time slots in a frame such that, for a given time slot, only one anchor is permitted to transmit via the optical channel.

Figures 6, 7, 8, 9:
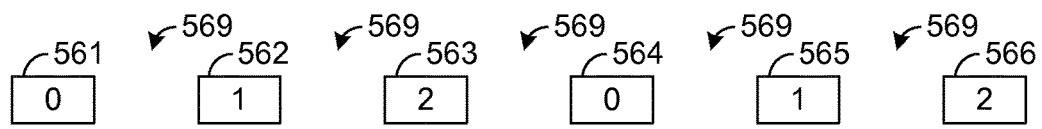
FIG. 6 is a block diagram illustrating an exemplary frame for an optical channel.
FIG. 7 is a block diagram illustrating an exemplary frame for an optical channel.
FIG. 8 is a block diagram illustrating an exemplary frame for an optical channel.
FIG. 9 is a block diagram illustrating an exemplary frame for an optical channel.

FIG. 6 shows an exemplary frame 533. For simplicity of illustration, the frame 533 depicted by FIG. 6 has nine time slots 541-549, but the frame 533 may have any number of time slots in other embodiments. In one example, each time slot 551-549 has a period of 100 milliseconds (ms), but other periods are possible. In one exemplary embodiment, the time slots 541 are consecutively allocated to the anchors 124, 126, and 128 in the same room 501 such that each anchor has the about same number of slots in the frame 533. In FIG. 5, a "0" is used to indicate that a time slot has been allocated to anchor 124, a "1" is used to indicate that a time slot has been allocated to anchor 126, and a "2" is used to indicate that a time slot has been allocated to anchor 128. As can be seen in FIG. 6, the time slots are allocated to the anchors 124, 126, and 128 in a consecutive order. That is, the first time slot 541 is allocated to anchor 124, the next time slot 542 is allocated to anchor 126, and the next time slot 543 is allocated to anchor 128. This allocation pattern is repeated until all of the time slots 541-549 have been allocated.

The anchors 124, 126, and 128 are preferably synchronized such that each anchor 124, 126, and 128 starts a respective frame at substantially the same time. In one exemplary embodiment, the anchors 124, 126, and 128 are synchronized via a signal, referred to herein as "synchronization signal," that is communicated to the anchors 124, 126, and 128 via the backhaul channel. Such synchronization (synch) signal can originate from any node of the network 100. In one embodiment, each network access device 132 and 134 (FIG. 1) generates the synch signal for its respective sub-network. Thus, referring to FIG. 1, the network access device 132 generates a synch signal for the anchors 122, 126, 124, and 128 of the sub-network 120, noting that it is unnecessary for all of the anchors of such sub-network 120 to be in the same room 501. In addition, the network access device 134 similarly generates a synch signal for the anchors 102, 104, and 106 of the sub-network 110. For brevity purposes, a description of the use of a synch signal with sub-network 120 will be described in more detail hereafter. It should be noted that a synch signal from the network access device 134 can be similarly used to synchronize the optical transmitters of the anchors 102, 104, and 106.

In one exemplary embodiment, the synch signal is a multicast message that is transmitted from the network access device 132 to each anchor 122, 124, 126, and 128 of the sub-network 120. Upon receiving the synch signal, each anchor 122, 124, 126, and 128 re-transmits the signal so that it can be received by other anchors of the sub-network 120. As long as each anchor 122, 124, 126, and 128 is reachable by at least one other anchor of the sub-network 120, it should receive the synch signal via the backhaul channel.

Generally, the anchors 122, 124, 126, and 128 of the sub-network 120 should receive the synch signal at substantially the same time. However, different anchors may be at different distances and/or numbers of hops away from the network access device 132 such that there may be a slight time difference between the reception of the synch signal at one anchor relative to the reception of the synch signal at another anchor. Further, there may be slight timing differences in the transmission and processing of a multicast message. However, as long as the timing differences are small relative to the periods of the time slots 541-549, such timing differences should not result in overlapping optical transmissions by the anchors. Further, there may be a slight delay between successive time slots to provide a margin of error, as may be desired, to account for any timing differences in the communication of the synch signal.

Each anchor 124, 126, and 128 uses the synch signal as a reference to control the timing of the frames in the optical channel. For example, each such anchor may mark the beginning of the frame 533 to occur at the time it receives a synch signal or to occur at some predefined time offset from the reception of the synch signal. As long as each anchor 124, 126, and 128 uses the same offset, then each anchor 124, 126, and 128 should start the frame 533 at about the same time such that the anchors 124, 126, and 128 in the same room 501 are synchronized. Thus, at any given time, only one anchor 124, 126, or 128 should be optically transmitting via its optical transmitter 483 to the tag 125.

Note that the network access device 132 is configured to periodically transmit the synch signal so that the anchors 124, 126, and 128 can periodically synchronize to the synch signal, thereby compensating for drift. The network access device 132 may transmit a synch signal for each frame 533 so that the timing of each frame 533 is marked by a separate synch signal. However, in other embodiments, it is possible for the transmission of the synch signal to be less frequent such that the same synch signal controls the timing of multiple frames 533.

By keeping the anchors 124, 126, and 128 synchronized such that they can adhere to the desired TDM control algorithm, the optical transmissions by the anchors 124, 126, and 128 should not overlap. Thus, when the tag 125 enters the room 501, the optical transmissions from any of the anchors 124, 126, and 128 should not interfere with the optical transmissions from any of the other anchors 124, 126, and 128 even though each of the anchors 124, 126, and 128 may be within a line of sight of the tag 125. Thus, in the absence of optical interference, the tag 125 should be able to quickly receive the room identifier or other information that is being optically transmitted by the anchors 124, 126, and 128. Notably, in the embodiment described above, the infrastructure for providing the backhaul channel is leveraged to provide a synchronization function to the anchors 124, 126, and 128 in the room 501 so that specialized synchronization circuitry is unnecessary. Indeed, once the network 100 is installed in order to enable communication among the nodes of the network 100, there is no need to install additional hardware in order synchronize the anchors 124, 126, and 128 for optical communication.

As described above, some of the anchors 124, 126, and 128 may be DC anchors and some may be AC anchors. In one exemplary embodiment, an anchor's allocation of the time slots within the frames 533 is based on whether it is an AC anchor or a DC anchor. In this regard, more time slots are allocated to the anchor 124, 126, or 128 for a given frame 533 if it is an AC anchor relative to an embodiment for which it is a DC anchor.

For example, assume that the anchor 124 is an AC anchor and that anchors 126 and 128 are DC anchors. Thus, the anchor 124 is powered by an AC power source, and the anchors 126 and 128 are only powered by a DC power source, such as batteries. As shown by FIG. 7 (noting that time slots allocated to the AC anchor 124 are indicated by a "0"), the AC anchor 124 may be allocated more time slots than the anchors 126 and 128, and the AC anchor 124 may, therefore, be permitted to transmit for a longer total duration per frame. In the example shown by FIG. 7, each time slot allocated to a DC anchor 126 or 128 is immediately preceded and followed by time slots allocated to the AC anchor 124. Thus, time slots are allocated in an alternating fashion between AC anchors and DC anchors such that every other time slot is allocated to the AC anchor 124.

Such algorithm allocates more time per frame to the AC anchor 124 relative to any of the DC anchors 126 or 128. However, since the AC anchor 124 is powered via an AC power source, such as a wall outlet, the longer transmit duration of the AC anchor 124 is not likely a concern. In this regard, the AC anchor 124 is not powered by batteries, which would be discharged to a greater extent by the longer transmit time. Having shorter transmit durations for the DC anchors 126 and 128 helps to conserve power, thereby increasing the life expectancy of the batteries that may be used to power these DC anchors 126 and 128.

There are various techniques that may be used to establish the frame format used by the anchors 124, 126, and 128 for the in-room channel. As an example, the anchors 124, 126, and 128 may be provisioned by a technician at installation in order to define a desirable frame format. In one exemplary embodiment, the server 120 is configured to automatically define the frame format based on information from the anchors 124, 126, and 128. In this regard, during installation of the anchors 124, 126, and 128, a technician provides an input (referred to herein as "power status") to each of the anchors 124, 126, and 128 indicating whether the respective anchor is an AC anchor or a DC anchor based on the type of power source that is used to power the anchor. The technician also provides an input indicating the room identifier of the room 501 in which the anchor is located. After powering up and joining the network 100, each respective anchor 124, 126, and 128 transmits a message to the server 120 indicating the anchor's room identifier and power status. Based on the room identifiers from the anchors 124, 126, 128, the server 120 determines that the anchors 124, 126, and 128 are in the same room 501 and defines a frame format that is to be used by each of these anchors 124, 126, and 128 based on the number of anchors in the room 501 and the power status of each of the anchors in the room 501. Preferably, the server 120 allocates the time slots such that DC anchors in the room 501 communicate less frequently than the AC anchors. For example, if the anchor 124 is an AC anchor and if the anchors 126 and 128 are DC anchors, the sever 120 may define a frame format according to FIG. 7. After defining the frame format, the server 120 transmits to each anchor 124, 126, and 128, a message indicating which time slots of the frame have been allocated to the respective anchor. Thus, the anchors 124, 126, and 128 have sufficient information to implement the frame format defined by the server 120.

There are various types of algorithms that the server 120 may use to define the frame format. In one exemplary embodiment, the server 120 allocates the timeslots in alternating fashion such that between any two successive time slots allocated to any of the DC anchors (referred to herein as "DC time slots") there is one or more time slots allocated to an AC anchor (referred to herein as "AC time slots"). As an example, between two successive DC time slots, there may be a number of AC time slots corresponding to the number of AC anchors in the room 501 such that there is one AC time slot for each AC anchor. Thus, in an embodiment where the anchor 124 is the only AC anchor in the room 501, there may be one AC time slot (i.e., time slot "0") between successive DC slots (i.e., time slots "1" and 2"), as shown by FIG. 7. In other embodiments, other algorithms may be used to allocate time slots.

For example, in another embodiment, the server 120 is configured to define a plurality of time slots 561-566 that are spaced apart in time, as shown by FIG. 8. Each of the time slots are consecutively allocated to the anchors 124, 126, and 128 in the room 501 in an alternating fashion or via some other algorithm. Further, each time slot is separated from the next time slot by a quiet period 569 that is not allocated to any of the anchors such that none of the anchors should be transmitting in the quiet periods 569. In one exemplary embodiment, each time slot 561-566 is 40 milliseconds (ms) and is separated from the next time slot by a quiet period of 60 ms, although other time periods may be used in other embodiments. The duration of the quiet periods 569 is selected based on the amount of time it is desired for DC anchors to be transmitting in each frame. That is, increasing the duration of the quiet periods 569 generally reduces the transmission time in each frame resulting in less frequent transmissions by the DC anchors. Thus, increasing the duration of the quiet periods 569 generally conserves the power of DC anchors. On the other hand, decreasing the duration of the quiet periods 569 generally results in more frequent transmissions by the DC anchors. Thus, decreasing the duration of the quiet periods 569 generally increases the power burdens of the anchors. Moreover, the duration of the quiet periods 569 and, hence, the rate of transmissions by the anchors is selected based on competing considerations regarding performance and power conservation.

In yet another exemplary embodiment, the frame is initially defined as described above for FIG. 8, but the time periods between the spaced-apart time slots 561-566 are allocated to the AC anchors in the same room, noting that these AC anchors are not affected by the same power conservation considerations as DC anchors and, therefore, may be permitted to transmit for longer durations. Thus, in the embodiment described above in which the anchor 124 is the only AC anchor in the room 501, all of the time between the time slots 561-566 is allocated to the anchor 124, as shown by FIG. 9 in which "0" indicates that a given time slot is allocated to the anchor 124. By allocating the time between time slots 561-566 to AC anchors, the amount of time that at least one AC anchor is transmitting in the room is increased without increasing the power burdens of the DC anchors 126 and 128.

In one exemplary embodiment, time slot allocation is achieved by manual provisioning the anchor rather than having the server 120 specify the time slot allocation. There are various techniques that can be used to manually provision the time slots in any desired manner. An exemplary frame is depicted by FIG. 10.

Figure 10:
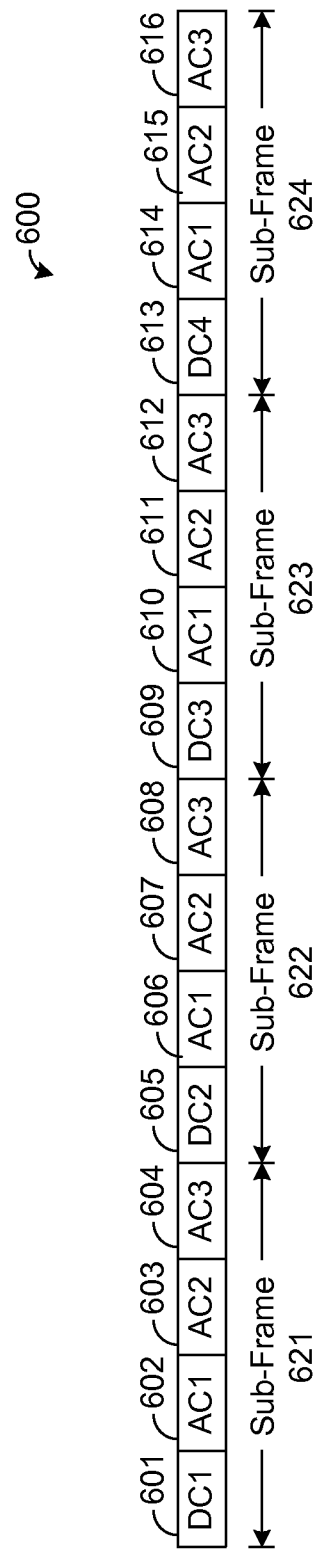
FIG. 10 is a block diagram illustrating an exemplary frame for an optical channel.

For illustrative purposes, assume that the total duration of the frame 600 shown by FIG. 10 is 400 milliseconds (ms) and that the frame 600 is segmented into 16 time slots 601-616 of 25 ms each. In other embodiments, other durations of the frame and the time slots are possible.

Each frame 600 is divided into a plurality of sub-frames 621-624 where each sub-frame 621-624 is 100 ms and has four time slots. During provisioning, each anchor is assigned a respective index indicating which time slots 601-616 are allocated to the anchor. In this regard, a technician provides an input indicative of the anchor's index. In addition, the technician also provides an input indicating whether the anchor is an AC anchor or DC anchor (e.g., indicating the anchor's power status). In this example, an anchor is configured to transmit across the backhaul channel every 100 ms if it is an AC anchor and every 400 ms is it is a DC anchor. Thus, each AC anchor transmits across the in-room channel four times as fast as DC anchors, although other ratios are possible in other embodiments.

In one exemplary embodiment, the index assigned to an anchor has four possible values (1-4), though other numbers of possible values are possible in other embodiments. In addition, the first time slot of each sub-frame is allocated for transmission by DC anchors. That is, time slots 601, 605, 609, and 613, referred to hereafter as "DC time slots," are allocated for transmission by DC anchors. The remaining time slots, referred to hereafter as "AC time slots," are allocated for transmission by AC anchors.

The index received by a DC anchor indicates the DC time slot in which the DC anchor is to transmit per frame 600. For example, an index value of "0" may be correlated with the DC time slot 601, an index value of "1" may be correlated with the DC time slot 605, an index value of "2" may be correlated with the DC time slot 609, and an index value of "3" may be correlated with the DC time slot 613. During provisioning, a technician essentially allocates the DC time slots by inputting a different index value into each DC anchor, and each DC anchor is configured to transmit during the DC time slot correlated with its received index value such that it transmits in only one DC time slot per frame 600. That is, the DC anchor ("DC1") receiving a first index value transmits in DC time slot 601, the DC anchor ("DC2") receiving a second index value transmits in DC time slot 605, the DC anchor ("DC3") receiving a third index value transmits in DC time slot 609, and the DC anchor ("DC4") receiving a fourth index value transmits in DC time slot 613. In this example, the index value provided to a DC anchor essentially identifies the sub-frame 621-624 in which the DC anchor is permitted to transmit since each sub-frame 621-624 has only one DC time slot. In the present example, the technician can provide up to four possible indices for supporting up to four DC anchors.

The index received by an AC anchor indicates the AC time slot in which the AC anchor is to transmit per sub-frame 621-624. For example, in sub-frame 621, an index value of "1" may be correlated with the AC time slot 602, an index value of "2" may be correlated with the AC time slot 603, and an index value of "3" may be correlated with the AC time slot 604. Note that, to an AC node, an index value of "0" may indicate the first time slot of the sub-frame (e.g., time slot 601 in sub-frame 621). However, as described above, such time slot is allocated for transmissions by DC anchor and thus is not assigned to an AC anchor, as will become apparent in the following description.

During provisioning, a technician essentially allocates the AC time slots by inputting a different index value into each AC anchor, and each AC anchor is configured to transmit during the AC time slot correlated with its received index value such that it transmits in only one AC time slot per sub-frame 621-624. That is, for the sub-frame 621, the AC anchor ("AC1") receiving a first index value transmits in AC time slot 602, the AC anchor ("AC2") receiving a second index value transmits in AC time slot 603, and the AC anchor ("AC3") receiving a third index value transmits in AC time slot 604. Since the transmission by the anchors are periodic (e.g., every 100 ms for AC anchors), the index received by an AC anchor controls when the AC anchor transmits in each sub-frame. That is, if an AC anchor is allocated the second time slot 602 of sub-frame 621, it will also transmit in the second time slot (i.e., time slots 606, 610, and 614) of the other sub-frames 622-624, respectively. Similarly, if an AC anchor is allocated the third time slot 603 of sub-frame 621, it will also transmit in the third time slot (i.e., time slots 607, 611, and 615) of the other sub-frames 622-624, and so on. Accordingly, in this example, the index value provided to an AC anchor essentially identifies a time slot in each sub-frame 621-624 in which the AC anchor is permitted to transmit. In the present example, the technician can provide up to three possible indices for supporting up to three AC anchors, assuming that one time slot per frame is allocated for transmissions by DC anchors.

Accordingly, in the example frame format shown by FIG. 10, up to four DC anchors may be respectively allocated four DC time slots (labeled DC1, DC2, DC3, and DC4) in order to allow each DC anchor to transmit once per frame 600, and up to three AC anchors may be respectively allocated three AC time slots (labeled AC1, AC2, and AC3) in order to allow each AC anchor to transmit once per sub-frame or four times per frame 600.

Note that the same format may be used in a longer frame thereby permitting the DC anchors to transmit more than once per frame. For example, in one embodiment, the duration of a frame is increased to 1.2 ms, and the time slot pattern shown by FIG. 10 is repeated two more times to complete the frame. That is, since each DC anchor transmits every 400 ms, a given DC anchor is allocated three time slots in a 1.2 ms frame. An AC anchor, on the other hand, is allocated twelve time slots in the same 1.2 ms frame.

It should be emphasized that the frame formats and allocation techniques described above are exemplary. Various other types of formats and techniques, including changes or modifications to the exemplary formats and techniques described herein, would be apparent to a person of ordinary skill upon reading this disclosure.

Now, therefore, the following is claimed:

1. An asset tracking system, comprising:
   a wireless network having a plurality of nodes configured to communicate wireless electrical signals via a first electrical channel, the nodes having optical transmitters configured to transmit wireless optical signals via an optical channel that is time-division multiplexed among the nodes, wherein messages communicated via the first electrical channel hop from node-to-node through the wireless network, and wherein one of the wireless optical signals from one of the nodes includes a room identifier identifying a room of a building in which the one node is located;
   a tag configured to receive the wireless optical signals, including the one wireless optical signal having the room identifier, the tag further configured to transmit a first message via a wireless electrical signal to one of the nodes via a second electrical channel, wherein the first message includes the room identifier, and wherein the nodes are configured to transmit the first message via the first electrical channel; and
   a server configured to receive the first message from the nodes and to determine a location of the tag based on the room identifier, the server further configured to transmit a second message for controlling the tag to the nodes via the first electrical channel, wherein at least one of the nodes is configured to transmit the second message to the tag via the second electrical channel, wherein the nodes are configured to transmit an electrical synchronization signal via the first electrical channel and to synchronize the optical transmitters based on the electrical synchronization signal.

2. An asset tracking system, comprising:

a wireless network having a plurality of nodes configured to communicate wireless electrical signals via a first electrical channel, the nodes having optical transmitters configured to transmit wireless optical signals via an optical channel that is time-division multiplexed among the nodes, wherein messages communicated via the first electrical channel hop from node-to-node through the network;

a tag configured to receive the wireless optical signals from the nodes via the optical channel, the tag further configured to transmit a first message via a wireless electrical signal to at least one of the nodes having at least one of the optical transmitters, the first message including data from one of the wireless optical signals received by the tag; and a server configured to receive the first message and to determine a location of the tag based on the data, wherein the nodes are configured to transmit an electrical synchronization signal via the first electrical channel and to synchronize the optical transmitters based on the electrical synchronization signal, and wherein the at least one node is configured to transmit the first message to the server.

3. The system of claim 2, wherein the electrical synchronization signal defines a multicast message.

4. The system of claim 3, wherein one of the optical transmitters of one of the nodes is configured to transmit a frame having time slots, each of the time slots allocated to a respective node of the wireless network, wherein the one node is configured to control a timing of the frame based on a time that the one node receives the multicast message.

5. The system of claim 2, wherein the tag is configured to transmit the first message to at least one of the nodes via a second electrical channel, and wherein the wireless electrical signals communicated via the first electrical channel are separated in frequency from wireless electrical signals transmitted via the second electrical channel.

6. The system of claim 5, wherein the wireless electrical signal transmitted by the tag via the second electrical channel includes data from one of the wireless optical signals.

7. The system of claim 5, wherein one of the wireless optical signals includes a room identifier identifying a room of a building, and wherein the wireless electrical signal transmitted by the tag via the second electrical channel includes the room identifier.

8. The system of claim 2, further comprising a server, wherein the nodes are configured to transmit data from the tag to the server via the first electrical channel.

9. The system of claim 8, wherein the server is configured to determine a location of the tag based on the data.

10. An asset tracking system, comprising:

a wireless network having a plurality of nodes configured to communicate wireless electrical signals via a first electrical channel, the nodes having optical transmitters configured to transmit wireless optical signals via an optical channel that is time-division multiplexed among the nodes, wherein messages communicated via the first electrical channel hop from node-to-node through the network; and a tag configured to receive the wireless optical signals from the nodes via the optical channel, wherein the nodes are configured to transmit an electrical synchronization signal via the first electrical channel and to synchronize the optical transmitters based on the electrical synchronization signal, wherein the nodes are configured to transmit a frame via the optical channel, and wherein the frame has time slots allocated to the nodes such that one of the nodes powered by an alternating current (AC) power source is allocated more time slots in the frame relative to at least one of the nodes powered by a direct current (DC) source.

11. An asset tracking system, comprising:

a wireless network having a plurality of nodes configured to communicate wireless electrical signals via a first electrical channel, the nodes having optical transmitters configured to transmit wireless optical signals via an optical channel that is time-division multiplexed among the nodes, wherein messages communicated via the first electrical channel hop from node-to-node through the network;

a tag configured to receive the wireless optical signals from the nodes via the optical channel; and a server configured to communicate with the nodes via the first electrical channel, wherein the nodes are configured to transmit an electrical synchronization signal via the first electrical channel and to synchronize the optical transmitters based on the electrical synchronization signal, wherein the nodes are configured to transmit via the optical channel a frame having time slots, wherein each of the nodes is configured to store data indicating whether the respective node is powered by an alternating current (AC) power source, and wherein allocation of the time slots to the nodes is based on the data.

12. A method for use in an asset tracking system, comprising:

communicating wireless electrical signals among nodes of a wireless network via a first electrical channel;

transmitting wireless optical signals from optical transmitters of the nodes to the tag via an optical channel that is time-division multiplexed among the nodes;

transmitting from the tag a first message via the first electrical channel to at least one of the nodes having at least one of the optical transmitters, the first message including data from one of the wireless optical signals;

transmitting the first message from the at least one node to a server;

determining a location of the tag at the server based on the data;

transmitting an electrical synchronization signal among the nodes via the first electrical channel; and synchronizing the optical transmitters based on the electrical synchronization signal.

13. The method of claim 12, wherein the electrical synchronization signal defines a multicast message.

14. The method of claim 12, further comprising:

transmitting a frame having time slots via one of the optical transmitters; and controlling a timing of the frame based on the electrical synchronization signal.

15. A method for use in an asset tracking system, comprising:

communicating wireless electrical signals among nodes of a wireless network via a first electrical channel;

monitoring a location of a tag based on the wireless electrical signals;

transmitting wireless optical signals from optical transmitters of the nodes to the tag via an optical channel that is time-division multiplexed among the nodes wherein the wireless optical signals define a frame;

transmitting an electrical synchronization signal among the nodes via the first electrical channel;

synchronizing the optical transmitters based on the electrical synchronization signal determining which of the nodes are powered by alternating current (AC) power sources; and allocating time slots of the frame to the nodes based on the determining.

16. The method of claim 12, further comprising transmitting a wireless electrical signal from the tag to at least one of the nodes via a second electrical channel, wherein the wireless electrical signals communicated via the first electrical channel are separated in frequency from the wireless electrical signal transmitted via the second electrical channel.

17. The method of claim 16, wherein the wireless electrical signal transmitted by the tag via the second electrical channel includes data from one of the wireless optical signals.

18. The method of claim 16, wherein one of the wireless optical signals includes a room identifier identifying a room of a building, and wherein the wireless electrical signal transmitted by the tag via the second electrical channel includes the room identifier.

19. The method of claim 12, further comprising:

transmitting from the server a second message for controlling the tag to at least one of the nodes via the first electrical channel; and transmitting the second message from at least one of the nodes to the tag.

20. The method of claim 19, wherein the transmitting from the tag comprises transmitting the first message from the tag via a second electrical channel, and wherein the transmitting the second message from at least one of the nodes to the tag comprises transmitting the second message via the second electrical channel.

21. An asset tracking method, comprising:

communicating wireless electrical signals among a plurality of nodes of a wireless network via a first electrical channel, wherein messages communicated via the first electrical channel hop from node-to-node through the wireless network;

transmitting wireless optical signals from optical transmitters via an optical channel that is time-division multiplexed;

receiving the wireless optical signals at a tag;

transmitting from the tag a first message via a wireless electrical signal to one of the nodes, the first message including data from the one of the wireless optical signals received by the tag;

transmitting the first message from the one node to a server via the first electrical channel;

determining a location of the tag with the server based on the data;

transmitting a second message for controlling the tag from the server to at least one of the nodes via the first electrical channel;

transmitting the second message to the tag by at least one of the nodes;

transmitting an electrical synchronization signal via the first electrical channel; and synchronizing the optical transmitters based on the electrical synchronization signal.

22. The method of claim 21, wherein the transmitting from the tag comprises transmitting the first message from the tag via a second electrical channel, and wherein the transmitting the second message to the tag comprises transmitting the second message via the second electrical channel.

23. The system of claim 2, wherein the server is configured to transmit a second message for controlling the tag to at least one of the nodes via the first electrical channel, and wherein at least one of the nodes is configured to transmit the second message to the tag.

24. The system of claim 23, wherein the tag is configured to transmit the first message via a second electrical channel, and wherein at least one of the node is configured to transmit the second message to the tag via the second electrical channel.

* * * * *

UNITED STATES PATENT AND TRADEMARK OFFICE
CERTIFICATE OF CORRECTION

PATENT NO.        : 9,654,933 B2
APPLICATION NO.   : 14/176936
DATED             : May 16, 2017
INVENTOR(S)       : Mark Guagenti and David Ewing Page 1 of 1

It is certified that error appears in the above-identified patent and that said Letters Patent is hereby corrected as shown below:

In the Claims

Column 21 Claim 15, Line 14: Change "signal" to --signal;--

Signed and Sealed this
Second Day of October, 2018

Andrei Iancu
*Director of the United States Patent and Trademark Office*